(12) United States Patent
Erdmann et al.

(10) Patent No.: US 8,101,226 B2
(45) Date of Patent: Jan. 24, 2012

(54) EXTRUDED SOLID PRODUCT FOR USE IN FOODSTUFFS

(75) Inventors: Peter Erdmann, Bern (CH); Werner Pfaller, Orbe (CH); Giovanna Armida Ines Maurer, Boussens (CH); Peter Fankhauser, Konolfingen (CH)

(73) Assignee: Nestec S.A., Vevey (CH)

( * ) Notice: Subject to any disclaimer, the term of this patent is extended or adjusted under 35 U.S.C. 154(b) by 959 days.

(21) Appl. No.: 11/908,116

(22) PCT Filed: Mar. 8, 2006

(86) PCT No.: PCT/EP2006/060568
§ 371 (c)(1),
(2), (4) Date: Jan. 22, 2008

(87) PCT Pub. No.: WO2006/094999
PCT Pub. Date: Sep. 14, 2006

(65) Prior Publication Data
US 2008/0206434 A1    Aug. 28, 2008

(30) Foreign Application Priority Data
Mar. 8, 2005 (EP) ..................... 05005064

(51) Int. Cl.
*A23D 7/04* (2006.01)
(52) U.S. Cl. ..................... 426/602; 426/447
(58) Field of Classification Search .................. 426/602, 426/447
See application file for complete search history.

(56) References Cited

U.S. PATENT DOCUMENTS

| | | | |
|---|---|---|---|
| 3,434,843 A * | 3/1969 | Durst | 426/98 |
| 3,718,485 A * | 2/1973 | Lankford | 426/438 |
| 3,852,487 A * | 12/1974 | Van Werven et al. | 426/643 |
| 4,177,574 A | 12/1979 | Kobayashi et al. | |
| 4,461,777 A | 7/1984 | Murase et al. | |
| 4,616,047 A * | 10/1986 | Lafon | 523/105 |
| 4,853,236 A * | 8/1989 | Langler | 426/102 |
| 4,861,615 A * | 8/1989 | Wiedmann | 426/631 |
| 5,011,855 A | 4/1991 | Traitler et al. | |
| 5,244,675 A * | 9/1993 | Talignani | 426/572 |
| 5,338,559 A | 8/1994 | Schaaf et al. | |
| 5,411,756 A | 5/1995 | Wheeler et al. | |
| 5,700,512 A * | 12/1997 | Desjardins et al. | 426/557 |
| 5,922,385 A * | 7/1999 | Stipp et al. | 426/514 |
| 6,136,353 A | 10/2000 | Munz et al. | |
| 6,214,406 B1 * | 4/2001 | Reimerdes | 426/601 |
| 6,468,579 B1 | 10/2002 | Roussel et al. | |
| 2001/0055636 A1 | 12/2001 | Geromini et al. | |

FOREIGN PATENT DOCUMENTS

| | | |
|---|---|---|
| EP | 0 818 149 | 1/1998 |
| JP | 53-112287 | 9/1978 |
| JP | 7-41793 | 2/1995 |
| JP | 2000-505287 | 5/2000 |
| JP | 2001 346516 | 8/2002 |
| WO | WO 00/23038 | 4/2000 |
| WO | WO 02/094037 | 11/2002 |

OTHER PUBLICATIONS

Siew, W. L. et al. 1993. The International Journal of Oil Palm Research and Development 5(1)38.*
XP002338913, Derwent Publications Ltd., (1981).
Japanese Office Action dated Dec. 7, 2010 citing the JP references listed in this submission relating to JP 2008-500197, 9 pages.

* cited by examiner

*Primary Examiner* — Carolyn Paden
(74) *Attorney, Agent, or Firm* — K&L Gates LLP

(57) ABSTRACT

The present invention relates to a solid product comprising an extrudable mixture of an oil in water emulsion and a solid matrix. The solid product may be used in foodstuff e.g. as a beverage additive or as an instant beverage products or. The present invention further provides an oil in water emulsion that is stable under the conditions required to prepare such a solid product. Furthermore, in contrast to traditional spray- and freeze-dried powder based foodstuff additives like creamers, the solid product of the present invention spontaneously disperses when added to a aqueous media, i.e. stirring is not required. Furthermore, it may generate a foam without any foaming agents.

9 Claims, 2 Drawing Sheets

EXTRUDED SOLID PRODUCT FOR USE IN FOODSTUFFS

FIELD OF THE INVENTION

The present invention relates to a solid product comprising an extrudable mixture of an oil in water emulsion and a solid matrix. The solid product may be used in foodstuff e.g. as a beverage additive or as an instant beverage products for example. The present invention further provides an oil in water emulsion that is stable under the conditions required to prepare such a solid product. Furthermore, in contrast to traditional spray- and freeze-dried powder based foodstuff additives like creamers, the solid product of the present invention spontaneously disperses when added to a aqueous media, i.e. stirring is not required. Furthermore, it may generate a foam without any foaming agents.

BACKGROUND OF THE INVENTION

Normally, products like coffee whitener in instant form are produced by spray drying. However, products made by spray drying are presented in dry form and due to changes in consumer demands it is envisaged that more flexible presentations are needed such as products in liquid form or products that can be shaped into various forms. Furthermore, the spray drying process requires relatively voluminous production equipment and specific precautions are required in order to avoid microbial contamination or cross-contamination from other products produced in the same equipment. Accordingly, there is a need for developing an alternative method to spray drying, where it is easy to clean the equipment and possible to make fast changeovers.

SUMMARY OF THE INVENTION

In line with such increasing demand for more flexible solutions, the present inventors have developed an alternative method to that of spray drying, namely using extrusion. This method offers a flexible solution with respect to the product obtained and may avoid the need for further addition of ingredient after processing. When the product is obtained by spray drying, normally not all ingredients are included in the spray drying process, but some are added afterwards, however, when extrusion is used all ingredients may be subjected to the extrusion process, i.e. it is a more simple and economic process. Furthermore, the method is less sensitive towards oxidation, the equipment involved is easy to clean in order to avoid microbial or other kind of contamination, which leads to a safe production. Moreover, the method involving extrusion leads to a product with improved consistency.

An aim of the invention is to provide a spontaneously dispersible solid product to be used in foodstuff. A further aim of the invention is to provide a solid product that upon addition to water or another liquid gives a homogeneous mixture of fat and other components and vice versa. Further it is an aim of the invention to give a solid product that without foam forming or stabilising additives gives a stable foam layer in addition to whitening power.

Unexpectedly, the present inventors have found that it is possible to extrude a mixture comprising an oil in water emulsion without leading to coalescence or inversion of the emulsion. Thereby it is possible to obtain a solid product that has suitable properties when used e.g. as a nutritional product or food additive as it spontaneously disperses when added to water or vice versa and due to the fat components the solid product imparts whitening power to the product. Furthermore the solid product can, if desired, give a foam layer without addition of special foam formers. The extrudable mixture i.e. composed of the oil in water emulsion and a solid matrix can be compounded in several ways by variation of both the oil in water emulsion and the solid matrix, which leads to products that can be e.g. complete instant beverages or beverage additives. Examples of complete instant beverages are 3in1 formulations, wherein for instance creamer, sugar and coffee are extruded in an appropriate ratio. Because the entire solid product is extruded into fixed shapes containing all components, problems of segregation are entirely avoided.

In contrast to known formulations (typically prepared by spray drying), the solid product according to the present invention has preserved the properties especially with respect to whitening power and ability to disperse upon contact with an aqueous medium. To this end, a crucial issue is the possibility of extruding and expanding an oil in water emulsion together with a solid matrix to obtain a solid product in which the fat content (of the oily phase in the oil in water emulsion) is homogeneously distributed in the solid product and wherein the particle size of the oily substance(s) is sufficiently low so as to obtain the desired whitening power. Accordingly, it is of great importance that the oil in water emulsion suitable for use in the preparation of the solid product can withstand the extrusion and expansion conditions without leading to e.g. coalescence (i.e. the oily substances "flow" together or aggregates) or inversion of the emulsion (i.e. to form a water in oil emulsion instead, which leads to dispersion of the aqueous phase instead of the oily phase).

In one aspect, the present invention relates to an oil in water emulsion having a water content of at the most about 30% w/w and being stable towards coalescence and inversion when subjected to conditions involving i) extruding a mixture of the oil in water emulsion together with a solid matrix in a weight ratio of from 1:0.5 to about 1:5 by heating at a temperature of at least or exceeding the melting point of the mixture to obtain an extruded product, and ii) expanding the thus obtained extruded product in vacuum to obtain a solid product having at the most about 10% water content.

The present invention further relates to a solid product for use in foodstuffs composed of an oil in water emulsion as defined above extruded together with a solid matrix and expanded in vacuum, the oil in water emulsion comprising i) an oily phase comprising one or more fat components, and
ii) an aqueous phase, and the solid product being spontaneously dispersed when added to a aqueous media. The oily phase can also be denoted a fat phase, and in the oil in water emulsion the oily phase is dispersed in the continuous aqueous phase.

In a further aspect, the present invention relates to a method for providing a solid product for use in foodstuffs by i) extruding a mixture of an oil in water emulsion comprising an oily phase and an aqueous phase, and the oily phase comprising one or more fat components, together with a solid matrix by a temperature of at least or exceeding the melting point of the mixture to obtain an extruded material;
ii) expanding the extruded material in vacuum; and
iii) optionally removing residual moisture by drying
to obtain the solid product.

DETAILED DESCRIPTION OF THE INVENTION

Figure 1:
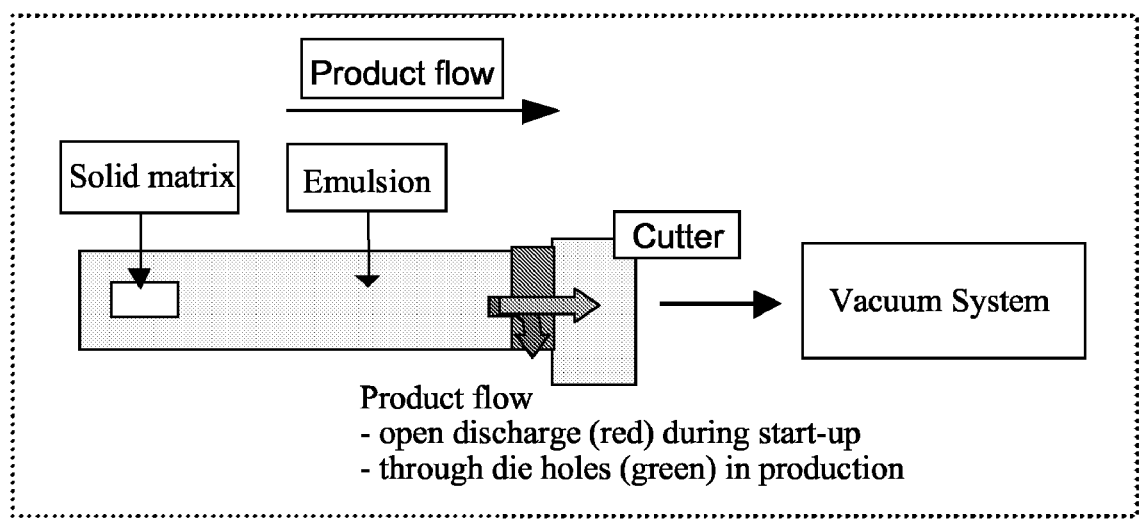
FIG. 1 shows a schematic set-up of the process

As mentioned above, the properties and constitution of the oil in water emulsions for use in the preparation of the solid product of the invention are crucial in order to achieve the desired result with respect to whitening power and dispersibility.

Accordingly, the present invention provides an oil in water emulsion that has a water content of at the most about 30% w/w and that is stable towards coalescence and inversion when subjected to conditions involving
i) extruding a mixture of the oil in water emulsion together with a solid matrix in a weight ratio of from 1:0.5 to about 1:5 by heating at a temperature of at least or exceeding the melting point of the mixture to obtain an extruded product, and
ii) expanding the thus obtained extruded product in vacuum to obtain a solid product having at the most about 10% water content.

The oil in water emulsion of the invention must fulfill the above-mentioned requirement with respect to extrusion and expanding. Any suitable extruder may be used such as, e.g. single screw, twin screw, multi screw, ring screw, planetary gear extruder, etc. or any other continuous or discontinuous mixing system with the possibility to shape the melt (melted mixture). Furthermore, the term "vacuum" used in the present context is intended to denote a pressure of between 0.01 and 250 mbar, preferably between 1 and 50 mbar. A particularly preferred range is between 10 and 25 mbar. A suitable solid matrix to be used in the above-mentioned test is maltodextrin DE 21 or maltodextrin DE 29 or mixtures thereof.

The present inventors have surprisingly found that the o/w emulsion is stable under high shear, high temperatures, high pressures and minimal amount of water in the extruder.

In order to obtain a relatively high load of fat particles and at the same time avoid coalescence and/or inversion during extrusion and expansion, the present inventors have found that it is important that the water content is relatively low, i.e. at the most about 30% w/w.

Moreover, the present inventors have found that if an emulsifier like e.g. caseinate is present, the weight ratio between the fat component and the emulsifier influences the stability of the emulsion. With respect to caseinate, the present inventors have found that an optimal weight ratio between fat and caseinate ratio is dependent on the specific amount of water employed. The ideal ratio between fat and caseinate is about 14 at 26% water (ideally 69% fat, 5% caseinate and 26% water). Normally, the weight ratio between fat and caseinate is in a range of from about 10 to about 18 at 26% of water. If the ratio is too low, there is a risk that the emulsion inverts (e.g. if the weight ratio is about 10-12 or lower at 26% water). If, however, the ratio is too high (e.g. 16-18 or more), it is not possible anymore to stabilise small fat particles. Other proteins may result in other suitable optimal ratios.

The emulsion according to the invention is an oil in water emulsion, i.e. containing an oily phase comprising one or more fat components and an aqueous phase. The oily phase is the disperse phase, which means that the one or more fat components are homogeneously distributed in the homogeneous phase (the aqueous phase). The size of the fat droplets or fat particles is normally very small (i.e. of micron size) so that a more even distribution of the fat particles is obtained and so that the stability of the emulsion is optimized to avoid coalescence or phase inversion. These two adverse reactions are highly unwanted. Coalescence means that the fat droplets or particles of the emulsion in a first step flow together and form larger droplets or particles. In a second step the oily phase may separate from the emulsion leading to a completely separated two phase system.

As mentioned above, the oil in water emulsion has a relatively high content of fat components. Accordingly, in one embodiment the fat component(s) constitute(s) from about 30 to about 75% w/w of the oil in water emulsion. Calculated on a dry matter basis, the fat component(s) constitute(s) up to about 95% w/w of the dry matter content of the emulsion such as, e.g., at least about 50% w/w, at least about 60% w/w, at least about 70% w/w, at least about 80% w/w or at least about 90% w/w.

The oil in water emulsion according to the invention is suitable used to prepare solid products for use in foodstuffs. It is thereof of importance that the fat component is acceptable for use in foodstuffs. In one embodiment of the invention, the fat component is selected from the group consisting of vegetable or animal fats and oils including apricot kernel oil, abricot oil, almond oil, avocado oil, castor oil, coconut fat, coconut oil, cocoa butter, corn oil, cottonseed oil, grape seed oil, jojoba oil, linseed oil, maize oil, olive oil, palm kern oil, palm oil, palmolein oil, peanut oil, persil oil, poppy seed oil, rapeseed oil, sesame oil, soybean oil, sunflower oil, thistle seed oil, walnut oil, wheat germ oil, beef tallow, fish oil, lard, milk fat, tall oil, whale oil, and the like; synthetic fats and oils; semi-synthetic fats and oils; hardening fats and oils including hardened palm kernel fat, Canola oil, and the like; hydrogenated and unhydrogenated fats and oils including hydrogenated castor oil, hydrogenated palm kernel oil and the like; and mixtures thereof.

As appears from the examples herein a suitable fat component is a mixture of rapeseed oil, corn oil, coconut oil and palmolein. Fat components of interest are accordingly selected from rapeseed oil, corn oil, coconut oil and palmolein, and mixtures thereof.

Another fat component suitable for use in an oil in water emulsion according to the present invention comprises one or more LC PUFAs (long chain polyunsaturated fatty acids), and/or milk fat.

An oil in water emulsion according to the invention may contain one or more additives acceptable for use in foodstuffs. The additive may be included in the oily phase and/or in the aqueous phase (normally dependent on the solubility of the additive in the individual phases). Suitable additives for the oily phase include, e.g., emulsifiers, stabilizers, texture improvers, thickening agents, foam formers, foam inhibitors, antioxidants, vitamins, flavors, etc. and suitable additives for the aqueous phase include, e.g., pH regulating agents, buffers, stabilizers, chelating agents, solubilisers, sugars, sweeteners, proteins, taste regulating agents, flavors, vitamins, nutrients including salts, minerals etc., coloring agents, etc.

Solid Product

In another aspect the invention relates to a solid product for use in foodstuffs. The solid product is composed of an oil in water emulsion as defined above extruded together with a solid matrix and expanded in vacuum, the oil in water emulsion comprising
i) an oily phase comprising one or more fat components, and
ii) an aqueous phase,
and the solid product being spontaneously dispersed when added to a aqueous media.

The oil in water emulsion imparts whitening power to the solid product. The whitening power obtained is acceptable, i.e. identical to or better compared with the whitening power obtained by spray drying a mixture of comparable composition. Whitening power may be measured by different apparatus and the values obtained (e.g. L and h° values) are highly dependant on the specific method employed. However, if e.g. a spray dried and an extruded product of similar composition is compared using the same conditions, the present inventors have found that the solid product obtained from the extrusion/expansion process has an comparable whitening power to the spray dried material.

The whitening power is mainly a function of fat content, the particle size and particle concentration in solution.

Accordingly, the mean particle size D(0.5) of the fat contained in the solid product is from about 0.3 μm to about 10 μm such as, e.g., from about 0.5 μm to about 7.5 μm, from about 0.6 μm to about 5 μm or from about 0.6 μm to about 4 μm.

With respect to the content of fat in the solid product, the fat components constitute from about 5 to about 50% w/w such as, e.g. from about 10 to about 45% w/w, from about 20 to about 40% w/w or from about 25 to about 35% w/w of the product.

The water content of the solid product is at the most about 7.5% w/w such as, e.g., at the most about 5% w/w, at the most about 3% w/w, at the most about 2% or at the most about 1.6% w/w. The solid product may be subjected to a drying process in order to achieve a desired maximal content of water.

As mentioned above, an important ingredient in connection with the extrusion process is the addition of a solid matrix to the oil in water emulsion. A suitable solid matrix contains e.g. carbohydrates such as one or more monosaccharides including glucose, fructose, galactose, disaccharides including lactose, sucrose, maltose, polysaccharides including maltodextrins, raftiline, raftilose, galacto-oligosaccharides esters of monosaccharides, esters of disaccharides, esters of polysaccharides and starches; and e.g. proteins such as milk proteins, i.e. caseinates, whey proteins, whey protein isolates, whey protein concentrates, whey powders, milk protein concentrates, full cream milk powder, skimmed milk powder and the hydrolysates thereof; soy proteins, soy isolates, etc, soy protein hydrolysates or mixtures thereof.

In a specific embodiment, the solid matrix comprises a maltodextrin such as a maltodextrin DE 6 to 48 including maltodextrin DE 21 and maltodextrin DE 29, and mixtures thereof.

In other embodiments, the solid matrix comprises coffee, tea, cacao, malt, vegetable extracts, herbs, aroma, flavor, sugars, or sweeteners, and mixtures thereof.

In order to enable extrusion of the emulsion used to prepare the solid product of the invention it is important that the extrusion is performed at a temperature of at least or exceeding the melting point of the mixture containing the oil in water emulsion and the solid matrix. As shown in the examples herein, a too low temperature leads to an instability of the emulsion during extrusion, which in turn leads to a solid product with insufficient, whitening power, oiling off, reduced solubility, flocculation and other unwanted effects as e.g. complete phase separation.

Apart from the above-mentioned melting point issue, a suitable composition of the mixture of the oil in water emulsion and the solid matrix is a composition, wherein the weight ratio between the oil in water emulsion and the solid matrix depends on the desired type of product. Generally, the weight ratio between the oil in water emulsion and the solid matrix is from about 1:0.5 to about 1:5 such as, e.g., from about 1:0.75 to about 1:4, from about 1:1 to about 1:3, from about 1:1 to about 1:2, from about 1:1 to about 1:1.5, or from about 1:1, about 1:1.25 or about 1:1.5.

The solid product obtained can be formed in to a shape like e.g. pellets, grains, beads, cores, or predefined shapes like e.g. a heart, a star, a polygon, etc. or it may be milled into a finely divided powder.

In contrast to e.g. spray dried products a solid product according to the invention, air is trapped within the solid product, and the air incorporated has a, non-circular shape as observed by fluorescence confocal microscopy. It can be compared to a frozen foam with not round air bubbles. As seen in the examples herein, a spray dried product does not have any or very little entrapment of air therein.

A solid product according to the invention may spontaneously form a foam upon contact with an aqueous medium. Normally such a foam layer is formed upon contact with 100 ml of water or 1% coffee solution 80° C. per 4.2 g of the product. The foam layer formed is from about 0.2 to about 3.5 cm such as from about 0.5 cm to about 2.5 cm, when the test is carried out in a 150 ml beaker.

The present invention relates also to a method for providing a solid product for use in foodstuffs by i) extruding a mixture of an oil in water emulsion comprising an oily phase and an aqueous phase, and the oily phase comprising one or more fat components, together with a solid matrix by a temperature of at least or exceeding the melting point of the mixture to obtain an extruded material;

ii) expanding the extruded material in vacuum; and iii) optionally removing residual moisture by drying to obtain the solid product.

A solid product according to the invention can have many different applications. Of particular interest is application within the food area for instance as a beverage additive or in a beverage product. Examples of beverage products are e.g. instant beverage products like e.g. coffee, tea, cafe latte, cappuccino, cacao beverage, etc. A solid product according to the invention can also be used as a dairy or non-dairy creamer or as nutritional formulas, Further, implementing the method of the invention requires less space than the spray drying technology conventionally used to produce such products and the method is quicker than conventional methods making the method overall significantly more cost-efficient.

The solid product obtained may be further processed to obtain a food or nutritional product, a beverage additive or a beverage product.

In the method mentioned above, the step of expanding the extruded material in vacuum is typically performed at a pressure between 0.01 and 250 mbar, preferably between 1 and 50 mbar. A particularly preferred range is between 10 and 25 mbar.

During the process steps i) and/or ii) normally at least about 50% w/w of the water contained in the oil in water emulsion is removed. However, in certain situations a step iii) is included to remove water and the residual moisture of the solid product is then normally at the most about 7.5% w/w such as, e.g., at the most about 5% w/w, at the most about 3% w/w, at the most about 2% or at the most about 1.6% w/w.

The following terms and definitions are used herein.

The term "stable" when used in connection with the o/w emulsion of the invention means that the emulsion is stable with respect to coalescence and/or is stable with respect to inversion, both visually determined.

The term "2in1 formulation" as used herein, is intended to mean a solid product comprising two different ingredients such as sugar, sweetener or non-dairy creamer, dairy creamer or texture improver. In the 2in1 formulation the ingredients are mixed in an appropriate amount and are extruded into one product. Non-limiting examples of uses for 2in1 formulations are instant beverage products like coffee, tea etc.

The term "3in1 formulation" as used herein, is intended to mean a solid product comprising three different ingredients such as a beverage e.g. coffee, cacao or other vegetable extract plus two other additives e.g. sugar, sweetener, non-dairy creamer, dairy creamer or texture improver. In the 3in1 formulation the ingredients are mixed in an appropriate amount and are extruded into one product. Non-limiting examples of uses for 3in1 formulations are instant beverage products like cafe latte, cappuccino etc.

The term "solid matrix" as used herein, is intended to mean a mixture of solid ingredients without added liquids, non-limiting examples of such solid ingredients are monosaccharides including glucose, fructose, galactose; disaccharides including lactose, sucrose, maltose; polysaccharides including maltodextrins DE 6 to 48, raftiline, raftilose; galactooligosaccharides esters of monosaccharides, esters of disaccharides, esters of polysaccharides, starches, sweeteners, proteins including milk proteins, soy proteins, vegetable extracts including coffee, tea, cacao, malt, herbs; flavors or mixtures thereof.

The term "spontaneously disperses" as used herein, is intended to mean a spontaneously i.e. without required stirring, dispersion and thereby mixing with a aqueous media.

The term "whitening power" as used herein, is intended to mean an effect of imparting a whitening or opalescence to a product.

The invention is further illustrated in the following non-limiting examples.

EXAMPLES

Abbreviations

NDC—non-dairy creamer
LC PUFA—long chain polyunsaturated fatty acid

The following examples illustrate solid products for use in foodstuffs made according to the present invention. In the examples a Clextral type BC45H co-rotating intermeshing twin-screw extruder has been used for the current study, but any other mono or multi screw, single or multi stage extrusion system (e.g. single screw, twin screw, multi screw, ring screw, planetary gear-extruder) with the appropriate screw configuration and operating conditions may be suitable as well.

Extrusion Conditions

The following process conditions represent tests achieving good product properties as mentioned above.
Process Set-Up, Screw and Die Configuration
  Clextral extruder: Type BC45H
  Processing length: 800 mm (L=14.4*D), 4 barrels
  Die plate: 32 holes of 1.5 mm diameter
Screw Configuration:

| Length | mm | 100 | 100 | 150 | 100 | 50 | 100 | 200 |
|---|---|---|---|---|---|---|---|---|
| Pitch | mm | 66 | 50 | 33 | 66 | BLO+ | 66 | 50 |
| N° of lights |  | 2 | 2 | 2 | 2 | 2 | 2 | 2 |

Schematic process set-up see FIG. 1

Example 1

Solid Product Suitable as a Non-Dairy Creamer

Formulation of Emulsion:

| Fat phase: | Water phase: |
|---|---|
| 340 g Palmkernal fat 45-46 | 120 g Water |
| 5.0 g Panodan 165 | 6.5 g K$_2$HPO$_4$ |
|  | 6.5 g Na$_3$Citrate |
|  | 6.5 g Sodium hexametaphosphate |
|  | 100 g Maltodextrine DE-40 |
|  | 12.5 g Milk protein concentrate |

Preparation of the fat phase: Palmkernel fat 45 is melted and mixed together with Panodan 165 at 65° C.

Preparation of the water phase: Water is heated to 65° C., the buffer salts and the maltodextrine are dissolved and stirred for 10 min. To this slightly yellow solution the milk protein concentrate is added and stirred for another 10 min at 65° C.

Preparation of the emulsion: The fat phase is added to the water phase under vigorous stirring until all fat is incorporated. Increase of viscosity. The pre-emulsion is stirred for another 5 min before the final homogenisation step. The final particle size distribution is reached by pumping the emulsion through a Supratron (rotor stator principle). A highly viscous emulsion is obtained and stored at 65° C. ready to be used for extrusion. The dry matter content is around 80% and the fat content is around 75% (on DM).

A) Extrusion of Creamer

By mixing i.e. 35 kg Emulsion (~80% DM) and 35 kg Maltodextrine DE-29 as a solid matrix in the Extruder, expanding into the vacuum and fixing the structure by removal of ~5% of water to 95% DM, a creamer is obtained in a "pellet" form. The creamer has a composition like a commercial product. The pellets dissolve easily, form a foam, have a close to identical whitening power to the reference. The mean size of the fat particles is D(0.5)-1.02 μm.

B) Extrusion of Creamer without Foam Formulation:

40 kg/h emulsion together with 31 kg/h of a solid matrix with the composition 98.8% Maltodextrine DE 40, 0.90% Ryoto sugar ester S-1570 and 0.90% Ryoto sugar ester S-370 are mixed in an extruder and at the same time heated up to 104° at the die plate. Expansion into vacuum of 40 mbar yields a shaped improved creamer with a moisture content of 4.5%. Residual moisture is removed by after drying at 50° C. to 3%. The mean size of the fat particles is D(0.5)=1.11 μm. Further processing details see Table 2.

C) Extrusion of 2in1 Formulation (Creamer and Sugar):

40 kg/h emulsion together with 48 kg/h of a solid matrix with the composition 65.9% Maltodextrine DE 29, 0.80% Ryoto sugar ester P-1670 and 33.3% sugar are mixed in an extruder and at the same time heated up to 84° at the die plate. Expansion into vacuum of 40 mbar yields a shaped 2in1 with a moisture content of 2.8%. The mean size of the fat particles is D(0.5)=0.693 μm. Further processing details see Table 2.

D) Extrusion of 3 in1 Formulation (Creamer, Sugar and Coffee):

22 kg/h emulsion 1 together with 70 kg/h of a solid matrix with the composition 21.0% Maltodextrine DE 29, 1.2% Ryoto sugar ester P-1670, 64.8% sugar and 13.0% Coffee powder are mixed in an extruder and at the same time heated up to 107° at the die plate. Expansion into vacuum of 23 mbar yields a shaped 3in1 with a moisture content of 2.1%. Further processing details see Table 2.

The mean size of the fat particles is D(0.5)=0.832 μm. A measure for the occurrence of fat eyes is the free fat (LI, cold extractable fat). For extruded 3in1 it is around 7.8%.

Example 2

Solid Product Suitable as a Non-dairy Creamer

Formulation of Emulsion:

| Fat phase: | Water phase: |
|---|---|
| 420 g Palmkernel fat 45-46 | 160 g Water |
| 2 g Panodan | 6.5 g Na$_3$Citrate |
| 3 g Dimodan | 6.5 g Sodium hexametaphosphate |
| 30.8 g Sodium caseinate |  |

Preparation of the fat phase: Palmkernel fat 45 is melted and mixed together with Panodan 165 and Dimodan at 65° C. Then sodium caseinate, preferably sieved through a sieve of 1 mm, is added to the fat phase maintaining the stirring action. A yellow suspension is obtained.

Preparation of the water phase: Water is heated to 65° C., the buffer salts are dissolved and stirred for 10 min.

Preparation of the emulsion: The fat phase is added to the water phase under gentle stirring until all fat/caseinate is incorporated. Increase of viscosity. The pre-emulsion is stirred for another 5 min before the final homogenisation step. The final emulsion is obtained by preheating to 95° C. and multi-stage homogenisation at 85° C. and total 300 bar. A highly viscous emulsion is obtained and pumped directly into the extruder.

Extrusion of final product: 37 kg/h emulsion together with 40 kg/h of a solid matrix with the composition 97.1% Maltodextrine DE 29, 0.880% Ryoto sugar ester P-1670 and 2.0% $K_2HPO_4$ are mixed in an extruder and at the same time heated up to 117° at the die plate. Expansion into vacuum of 45 mbar yields a shaped improved creamer with a moisture content of 6%. Residual moisture is removed by after drying at 50° C. to 3%. The mean size of the fat particles is D(0.5)=1.63 μm.

TABLE 2

| Parameter | | Ex. 1 A) NDC, standard | Ex. 1 B) NDC, w/o foam | Ex. 1 C) 2 in 1 | Ex. 1 D) 3 in 1 | Ex. 2 NDC |
|---|---|---|---|---|---|---|
| Trial N° | | 12402.05 | 12402.08 | 12479.07 | 12490.16 | 12864.02 |
| Emulsion | kg/h | 35 | 40 | 40 | 22 | 37 |
| Solid Matrix | kg/h | 35 | 31 | 48 | 70 | 49 |
| Temperature Barrel 1 | ° C. | 14 | 14 | 23 | 10 | 18 |
| Temperature Barrel 2 | ° C. | 40 | 40 | 42 | 40 | 60 |
| Temperature Barrel 3 | ° C. | 110 | 109 | 75 | 109 | 118 |
| Temperature Barrel 4 | ° C. | 110 | 110 | 86 | 110 | 122 |
| Temperature Die Plate | ° C. | 110 | 110 | 100 | 110 | 120 |
| Screw speed | rpm | 100 | 100 | 100 | 100 | 150 |
| Product Temperature | ° C. | 113 | 104 | 84 | 107 | 110 |
| Product Pressure | bar | 0.4 | 0.2 | 1.0 | 9.2 | 0.5 | multi-stage homogenisation at 85° C. and total 300 bar. A highly viscous emulsion is obtained and pumped directly into the extruder.

Extrusion of creamer formulation: 37 kg/h emulsion together with 49 kg/h of a solid matrix with the composition 97.1% Maltodextrine DE 29, 0.90% Ryoto sugar ester P-1670 and 2.0% Potassium Phosphate dibasic are mixed in an extruder and at the same time heated up to 110° at the die plate. Expansion into vacuum of 10 mbar yields a shaped improved creamer with a moisture content of 5.5%. Residual moisture is removed by after drying at 50° C. to 3%. The mean size of the fat particles is D(0.5)=1.29 μm. Further processing details see Table 2.

Example 3

Solid Product Suitable as a Dairy Creamer

Formulation of Emulsion:

| Fat phase: | Water phase: |
|---|---|
| 420 g Palmkernel fat 45-46 | 160 g Water |
| 2 g Panodan | 6.5 g $Na_3$Citrate |
| 3 g Dimodan | 6.5 g Sodium hexametaphosphate |
| | 100 g Sweet butter milk powder |

Preparation of the fat phase: Palmkernel fat is melted and mixed together with Panodan 165 and Dimodan at 65° C. A yellow solution is obtained.

Preparation of the water phase: Water is heated to 65° C., the buffer salts and sweet butter milk powder are dissolved and stirred for 15 min.

Preparation of the emulsion: The fat phase is added to the water phase under vigorous stirring until all fat is incorporated. Increase of viscosity. The pre-emulsion is stirred for another 5 min before the final homogenisation step. The final During the study, very different operating conditions have been tested some of them resulting in complete phase inversion. Especially the barrel temperature profile is of importance: Temperatures at and below the melting point of the fat always resulted in oil separation; the best products have been obtained so far at temperatures well above 100° C.

Example 4

Structure of Air Trapped in Extruded Solid Products According to the Invention

A Non-dairy creamer prepared by extrusion according to the invention was investigated by semi-invasive confocal microscopy. The specimen was polished in order to get a flat surface and cleaned using pressurized air. The surface was stained with a small drop of a solution of Nile red in ethanol.

Figure 2:
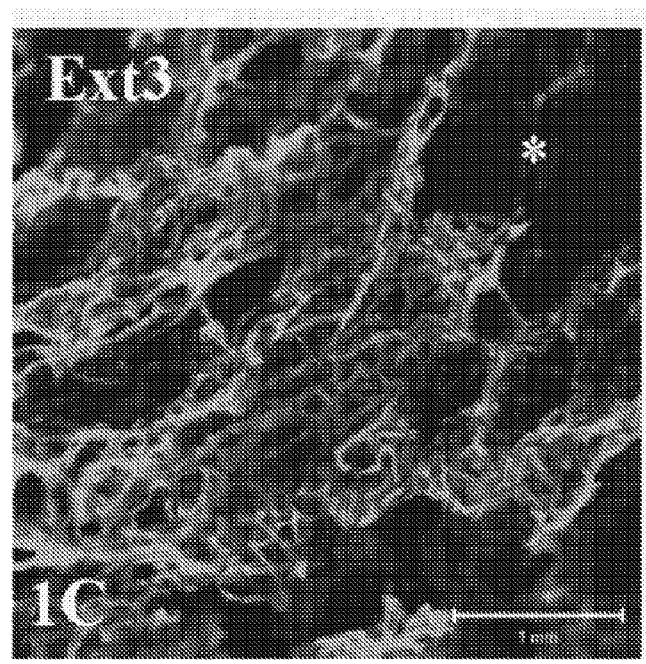
FIG. 2 shows fluorescence confocal microscopy of extruded creamer after abrasion and staining.
Figure 3:
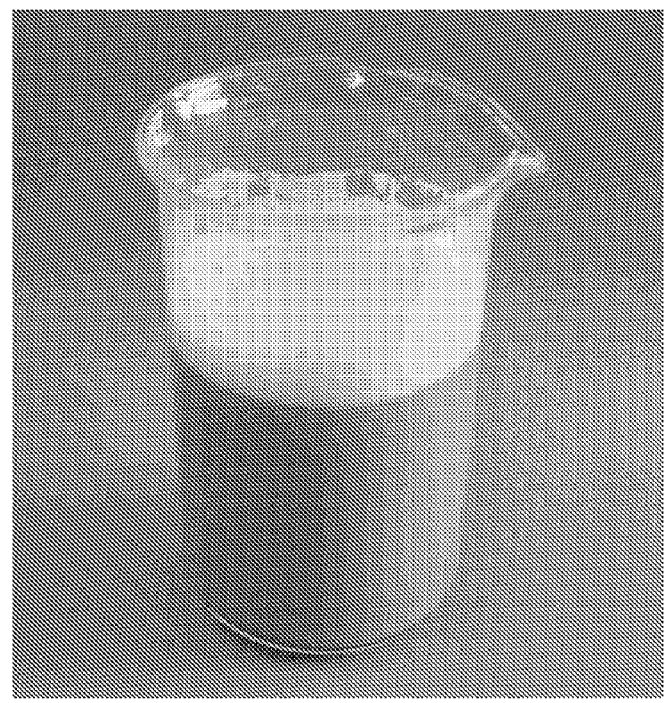
FIG. 3 shows formation of foam after dispersion of a non-dairy creamer according to examples 1, 2 and 3.

The creamer had a fat and water content as follows:
Ext. 3: water 6.55%, fat 32.07% w/w The structure of air in the non-dairy extruded creamer is shown in FIG. 2. The confocal microscopy is run at a low magnification.

Example 5

Comparative Example: A Solid Product not Suitable for Use as a Non-dairy Creamer Formulation of Emulsion:

| Fat phase: | Water phase: |
|---|---|
| 340 g Palmkernel fat 45-46 | 120 g Water |
| 5.0 g Panodan 165 | 6.5 g $K_2HPO_4$ |
| | 6.5 g $Na_3$Citrate |
| | 6.5 g Sodium hexametaphosphate |

Preparation of the fat phase: Palmkernel fat 45 is melted and mixed together with Panodan 165 at 65° C.

Preparation of the water phase: Water is heated to 65° C., the buffer salts are dissolved and stirred for 10 min.

Preparation of the emulsion: The fat phase is added to the water phase under vigorous stirring until all fat is incorporated. Increase of viscosity. The pre-emulsion is stirred for another 5 min before the final homogenisation step. The final particle size distribution is reached by pumping the emulsion through a Supratron (rotor stator principle). A highly viscous emulsion is obtained and stored at 65° C. ready to be used for extrusion. The dry matter content is around 80% and the fat content is around 75% (on DM).

Extrusion of creamer formulation: 35 kg/h emulsion together with 35 kg/h of a solid matrix with the composition 98.8% Maltodextrine DE 40 and 1.2% Panodan 165 are mixed in an extruder and at the same time heated up to 77° at the die plate. The temperature of the barrels starting from the feed zone were set to 15/40/85/85° C. The extruded creamer was soluble in hot coffee, however a large quantity of oil separates creating big oil droplets on the beverage surface.

The invention claimed is:

1. A solid product for use in foodstuffs, the solid product comprising a solid matrix and an oil in water emulsion having a water content of not more than 30% w/w and is stable towards coalescence and inversion when subjected to conditions involving i) extruding a mixture of the oil in water emulsion together with the solid matrix in an oil in water emulsion:solid matrix weight ratio of from 1:0.5 to about 1:5 by heating to a temperature of at least the melting point of the mixture to obtain an extruded product, and ii) expanding an obtained extruded product in vacuum to obtain a solid product having not more than a 10% water content extruded together with a solid matrix and expanded in vacuum, the oil in water emulsion comprising:
   i) an oily phase comprising at least one fat component in an amount of at least about 50% w/w of the dry matter content of the oil in water emulsion, and
   ii) an aqueous phase,
   the solid product being spontaneously dispersed when added to an aqueous media, wherein air is trapped in the solid product and has a non-circular shape as observed by fluorescence confocal microscopy.

2. A solid product for use in foodstuffs, the solid product comprising a solid matrix and an oil in water emulsion having a water content of not more than 30% w/w and is stable towards coalescence and inversion when subjected to conditions involving i) extruding a mixture of the oil in water emulsion together with the solid matrix in an oil in water emulsion:solid matrix weight ratio of from 1:0.5 to about 1:5 by heating to a temperature of at least the melting point of the mixture to obtain an extruded product, and ii) expanding an obtained extruded product in vacuum to obtain a solid product having not more than a 10% water content extruded together with a solid matrix and expanded in vacuum, the oil in water emulsion comprising
   i) an oily phase comprising at least one fat component in an amount of at least about 50% w/w of the dry matter content of the oil in water emulsion, and
   ii) an aqueous phase,
   the solid product being spontaneously dispersed when added to an aqueous media and spontaneously forms a foam layer upon contact with 100 ml of water per 4.2 g of the solid product.

3. The solid product according to claim 2, wherein the height of the foam layer is from about 0.2 to about 3.5 cm, when the test is carried out in a 150 ml beaker.

4. A method for providing a solid product for use in foodstuffs, the method comprising:
   i) extruding a mixture of an oil in water emulsion comprising an oily phase and an aqueous phase, and the oily phase comprising one or more fat components in an amount of at least about 50% w/w of the dry matter content of the oil in water emulsion, together with a solid matrix at a temperature of at least the melting point of the mixture to obtain an extruded material; and
   ii) expanding the extruded material in a vacuum to form the solid product.

5. The method according to claim 4, comprising removing residual moisture by drying to obtain the solid product.

6. The method according to claim 5, wherein the residual moisture of the solid product is not more than about 7.5% w/w.

7. The method according to claim 4, wherein expanding the extruded material in the vacuum is performed at a pressure of between 0.01 and 250 mbar.

8. The method according to claim 4, wherein at least about 50% w/w of the water contained in the oil in water emulsion is removed by steps i) and/or step ii).

9. The method according to claim 4 further comprising milling the solid product.

* * * * *